United States Patent
Wood et al.

[19]

[11] Patent Number: 6,091,808
[45] Date of Patent: Jul. 18, 2000

[54] METHODS OF AND APPARATUS FOR PROVIDING TELEPHONE CALL CONTROL AND INFORMATION

[75] Inventors: Timothy John Wood; John C. Anderson, both of Nepean; Shirley-Ann Milaknis, Kanata, all of Canada

[73] Assignee: Nortel Networks Corporation, Montreal, Canada

[21] Appl. No.: 08/730,856

[22] Filed: Oct. 17, 1996

[51] Int. Cl.[7] .................................................. H04M 3/42
[52] U.S. Cl. ...................... 379/201; 379/93.23; 379/216; 379/242; 379/355; 370/352
[58] Field of Search .................... 379/201, 209, 379/215, 265, 93.35, 216, 202, 203, 204, 205, 93.24, 242, 93.23; 370/352, 355

[56] References Cited

U.S. PATENT DOCUMENTS

| | | | |
|---|---|---|---|
| 4,866,758 | 9/1989 | Heinzelmann | 379/94 |
| 5,400,327 | 3/1995 | Dezonno | 370/62 |
| 5,500,891 | 3/1996 | Harrington et al. | 379/265 |
| 5,559,875 | 9/1996 | Bieselin et al. | 379/202 |
| 5,559,876 | 9/1996 | Alperovich | 379/205 |
| 5,568,540 | 10/1996 | Greco et al. | 379/89 |
| 5,590,128 | 12/1996 | Maloney et al. | 379/202 |
| 5,619,555 | 4/1997 | Fenton et al. | 379/202 |
| 5,625,682 | 4/1997 | Gray et al. | 379/209 |
| 5,661,790 | 8/1997 | Hsu | 379/230 |
| 5,689,553 | 11/1997 | Ahuja et al. | 379/205 |
| 5,742,674 | 4/1998 | Jain et al. | 379/209 |
| 5,768,359 | 6/1998 | DiPierro, Jr. et al. | 379/216 |
| 5,784,438 | 7/1998 | Martinez | 379/209 |
| 5,805,587 | 9/1998 | Norris et al. | 379/230 |
| 5,809,128 | 9/1998 | McMullin | 379/215 |
| 5,812,652 | 9/1998 | Jodoin et al. | 379/202 |
| 5,812,653 | 9/1998 | Jodoin et al. | 379/202 |
| 5,845,267 | 12/1998 | Ronen | 705/40 |
| 5,850,433 | 12/1998 | Rondeau | 379/88.17 |
| 5,884,032 | 3/1999 | Bateman et al. | 379/216 |

FOREIGN PATENT DOCUMENTS

96/31079  10/1996  WIPO .

OTHER PUBLICATIONS

"Computer Telephone Integration: Call Control vs. Voice Processing", R. Lee, Novell, Inc., Feb. 1995.

*Primary Examiner*—Scott Wolinsky
*Attorney, Agent, or Firm*—R. John Haley

[57] ABSTRACT

Telephone call management is provided via a computer network (web) facility which can be remotely accessed by subscribers using web browsers. The web facility includes an information database for storing personal telephone directories and call logs, and a telephone call control system coupled to a telephone switch via a switch-computer interface. Information on calls to and/or from telephone numbers of subscribers is communicated from the switch to the web facility to be stored in the database without requiring the subscribers' browsers to be active. Subscribers can make telephone calls and control telephone communications via the browsers and the web facility. Subscribers do not require any hardware or software in addition to a telephone and web browser.

14 Claims, 2 Drawing Sheets

6,091,808

METHODS OF AND APPARATUS FOR PROVIDING TELEPHONE CALL CONTROL AND INFORMATION

This invention relates to methods of and apparatus for providing telephone call control and information.

BACKGROUND OF THE INVENTION

It is well known to provide relatively sophisticated telephone call control and information features using a subscriber's telephone. Some examples of telephone call control features are dialling of stored numbers, redialling of previously dialled numbers, three-way calling, and call forwarding. Examples of telephone information features are calling number display, calling number logs, and call waiting messages. Numerous other examples of call control and information features exist.

Providing such features using the subscriber's telephone involves several disadvantages. For example, the telephone must be capable of providing the required control input and information display functions, so that it becomes a relatively complicated and expensive device. As further call control and information features are developed and become available, the telephone may be unable to accommodate them so that it must be replaced or upgraded to permit use of these further features. Even when the necessary functions are present in the telephone, use of the various functions is not generally simple or intuitive, typically requiring the subscriber to enter various number sequences and/or to interpret relatively cryptic displayed messages. Furthermore, these functions are limited to each individual telephone device, and they must be provided separately for different telephone devices.

Some of these disadvantages have been avoided or reduced by the use of computer-telephone integration (CTI) software which is run on a subscriber's computer in association with telephone control hardware such as a modem or telephone dialler. Such software can facilitate the display of information to, and the input of control information by, the subscriber, and in addition to the features discussed above can facilitate the provision of other features such as telephone directories and voice massaging. However, these CTI arrangements also have several disadvantages. In particular, they require the use of a computer, software, and telephone control hardware by the subscriber, and the computer system must be running continuously to collect information on incoming calls. In addition, such arrangements only provide information at the location at which the system is installed.

More sophisticated arrangements are also known for use with private branch exchange (PBX) and key system telephone networks deployed over a local area network (LAN), with similar disadvantages.

It is also known to provide so-called web call center applications. In this case a subscriber uses a web browser, which for example may be constituted by software running on the subscriber's computer system, to access a computer network such as the international computer network generally referred to as the Internet or World Wide Web, which for brevity is referred to below simply as the web. On browsing a company's web site and desiring to talk with a customer representative of the company, the subscriber can enter his name and telephone number into an HTML (hypertext markup language) page and click on a "submit" button, in response to which the company's telephone system initiates a telephone call from an available representative back to the subscriber. Such call center applications do not provide the telephone call control and information features discussed above.

An object of this invention is to provide improved methods of and apparatus for providing telephone call control and information.

SUMMARY OF THE INVENTION

According to one aspect, this invention provides a method of making a telephone connection comprising the steps of: remotely accessing a computer network facility to produce at the computer network facility a telephone connection message including information identifying calling and called telephone numbers; communicating the telephone connection message from the computer network facility to a telephone switch via a switch-computer interface; and establishing a telephone connection between the calling and called telephone numbers from the switch in response to the telephone connection message.

The step of establishing a telephone connection preferably comprises the step of providing a ringing signal to a telephone identified by the calling telephone number.

Preferably the step of remotely accessing the computer network facility comprises providing telephone number information from the computer network facility for remote display to a subscriber identified by the calling telephone number. The telephone number information can comprise a personal telephone directory of the subscriber, and logged information relating to telephone communications to and/or from the calling telephone number. The step of remotely accessing the computer network facility conveniently comprises operating a web browser.

Thus the invention enables subscribers to control telephone connections, and obtain information from telephone directories and call logs, using a web browser without any need for extra hardware to couple the browser to the telephone. Call logs are maintained without requiring the browsers of the subscribers to be active. In addition, the web or computer network facility can be accessed by each subscriber from any location with web access facilities.

Another aspect of the invention provides a telephone call management system comprising: a computer network facility including a server for communications with telephone subscribers, an information database, and a telephone call control system; a telephone switch including a switch-computer interface; and a communications path between the telephone call control system of the computer network facility and the switch-computer interface of the telephone switch; wherein information relating to telephone communications to and/or from telephone numbers of subscribers is communicated via the communications path from the telephone switch to the computer network facility and being stored in the database, and information for controlling telephone communications is communicated via the communications path from the computer network facility to the telephone switch in response to remote access by subscribers to the information database via the server of the computer network facility.

The invention also provides a method of telephone call management, comprising the steps of: storing personal telephone directories and call logs of telephone subscribers for remote access by the subscribers via a web facility; supplying information, relating to at least some telephone communications associated with the telephone subscribers, from a telephone switch to the web facility; updating the personal telephone directories and call logs of the telephone subscribers in dependence upon information supplied by the subscribers by the remote access via the web facility and the information supplied from the telephone switch; and supplying information from the web facility to the telephone switch, for controlling telephone communications for the subscribers via the telephone switch, in response to the remote access by the subscribers via the web facility.

BRIEF DESCRIPTION OF THE DRAWINGS

The invention will be further understood from the following description with reference to the accompanying drawings, in which.

DETAILED DESCRIPTION

Figure 1:
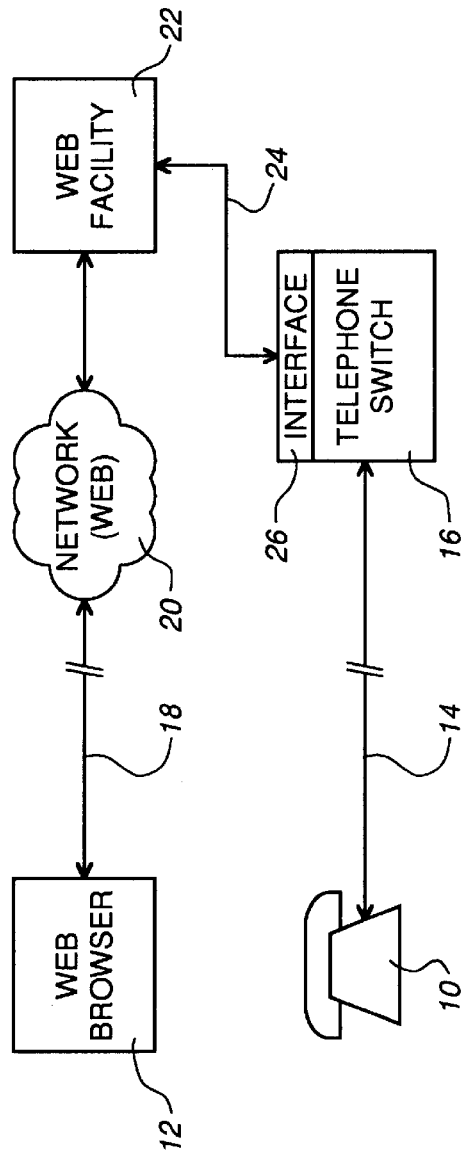
FIG. 1 is a block diagram schematically illustrating an arrangement in accordance with an embodiment of the invention.

Referring to FIG. 1, in an arrangement in accordance with an embodiment of the invention a telephone subscriber has at least one telephone 10 and a web browser 12. The telephone is coupled via a path 14 to a telephone switch 16, and the web browser is coupled via a path 18 to a network 20 constituting the web (Internet or World Wide Web). The forms of the telephone 10, web browser 12, and paths 14 and 18 are entirely arbitrary, and these can be known or yet to be devised. The telephone switch 16 can be a central office (C.O.) forming part of the public switched telephone network (PSTN), or a PBX or telephone key system which is coupled to the PSTN in a known manner.

For example, the telephone 10 can be a conventional telephone with pulse or DTMF (dual-tone multi-frequency) dialling, with or without any additional functions for control or information display, coupled to the telephone switch 16 via a twisted wire pair constituting the path 14. For the purposes of this invention, it is observed that even the dialling function of the telephone 10 is not essential and can be dispensed with (although it would of course be required for conventional use of the telephone 10). Alternatively, the path 14 could be provided via an ISDN (integrated services digital network) line or any other telephone communications path. With wireless communications, the telephone 10 can be a fixed or mobile telephone.

The path 18 can also be of any known or desired form, for example comprising a wireline or wireless data communications path which may be the same as or separate from the path 14. Likewise, the form of the web browser 12 is entirely arbitrary. For example it may comprise a personal computer executing browser software in known manner, or a dedicated network browsing device, or a web browsing function integrated within another device such as a video game device or a television receiver or other communications device. Similarly, the functions of the web browser 12 and telephone 10 can be integrated into a single unit, with or without other functions, in any desired manner.

Thus there are numerous ways in which the telephone 10 and web browser 12, and their paths 14 and 18, can be implemented, for example including a conventional telephone and personal computer executing browsing software coupled via separate twisted wire pair telephone lines (or via a single telephone line using multiplexed communications) to the telephone switch 16 and web 20, or an integrated mobile unit combining voice communication and network browsing functions coupled via wireless (e.g. infra-red or radio) communication paths to the web and the PSTN.

The arrangement of FIG. 1 also includes a web facility 22 that is coupled to, and thus can be considered as forming part of, the web 20. Details of the web facility 22 are described below. The web facility 22 is also coupled via a path 24 to a switch-computer interface (SCI) 26 which forms part of the telephone switch 16. The path 24 for example comprises a communications path providing X.25 communications between the web facility 22 and the SCI 26, but it can alternatively comprise any other desired form of communications path, including for example an Ethernet communications path via the network or web 20.

The SCI 26 is a known facility that is provided by the supplier of the telephone switch 16. For example, in the event that the telephone switch is a DMS™ telephone switch available from Northern Telecom Limited, then the SCI 26 is constituted by CompuCALL™ facilities also available from Northern Telecom Limited for that switch. Other forms of SCI are available for other telephone switches. The interface 26 can use any of a variety of protocols, such as SCAI (Switch-Computer Access Interface), SPI (Service Programming Interface), or OAP (Open Automated Protocol). In addition, higher level interfaces, such as TSAPI (Telephony Server Application Programming Interface), TAPI (Telephony Application Programming Interface), or JTT (Java Telephony Toolkit) can be implemented in the SCI 26, or in the CCI 46 described below. In any event, the SCI 26 provides on the path 24 information about telephone calls to telephone lines or directory numbers handled by the switch, and can also control the switch in response to control information supplied via the path 24 to establish calls as described further below.

The web facility 22 provides an interface to the subscriber, via the web 20, path 18, and browser 12, in the form of one or more web pages that enable the subscriber to manage at least some and preferably all telephone functions for the telephone 10. These functions for example can include all of the functions referred to in the introduction, some of which are further discussed below, as well as other functions which may be desired. To this end, the web facility 22 also communicates call control signals and information relating to these telephone functions with the telephone switch 16 via the path 24 and the SCI 26.

Figure 2:
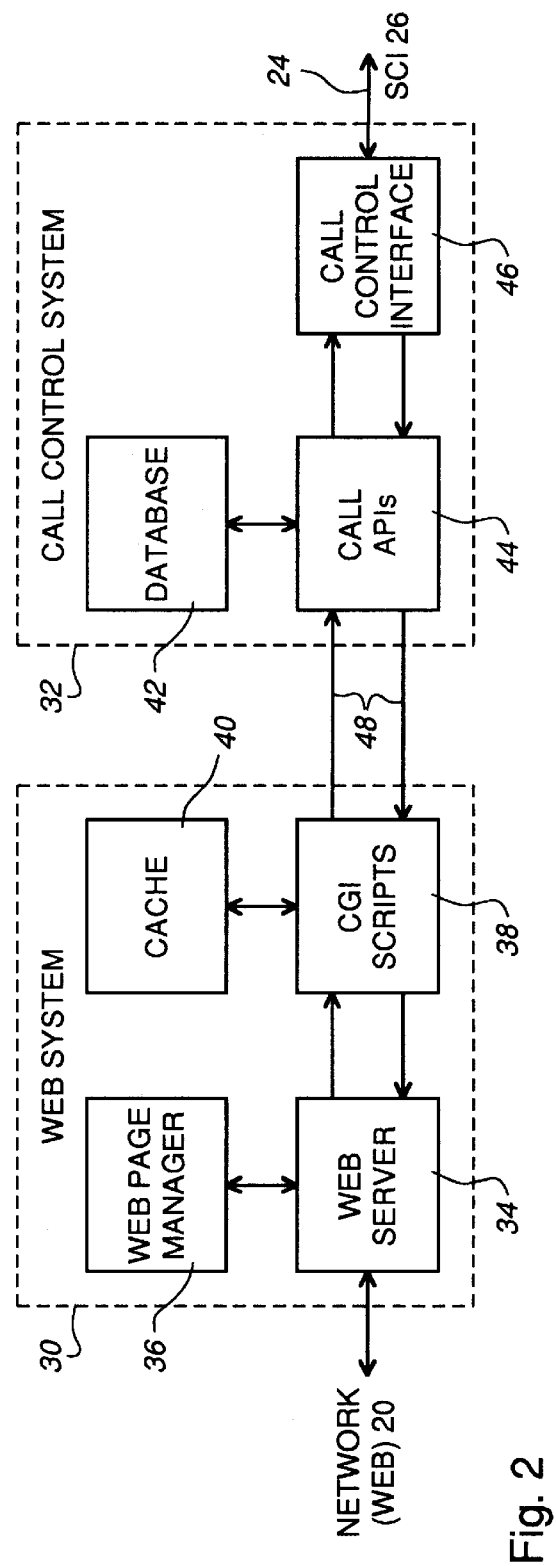
FIG. 2 is a block diagram schematically illustrating one form of a web facility of the arrangement of FIG. 1.

Accordingly, the web facility 22 constitutes a web server interface for subscriber information and call management functions, and can have any form that enables these functions to be provided and that provides corresponding communications with the telephone switch 16 via the path 24 and SCI 26. FIG. 2 illustrates by way of example one form of the web facility 22. This form of the web facility 22 comprises two computer systems, shown in FIG. 2 within dashed-line boxes and referred to below as a web system and a call control system 32. By way of example, the web system 30 may comprise a Windows NT™ computer system and the call control system 32 may comprise a DEC Alpha 2100™ computer system.

The division of the web facility 22 between the two computer systems 30 and 32 is convenient for providing a security firewall between the public network 20 to which the web system 30 is connected and the private data within the computer system 32, but all of the functions of the web facility 22 could alternatively be provided on a single computer system.

Figure 3:
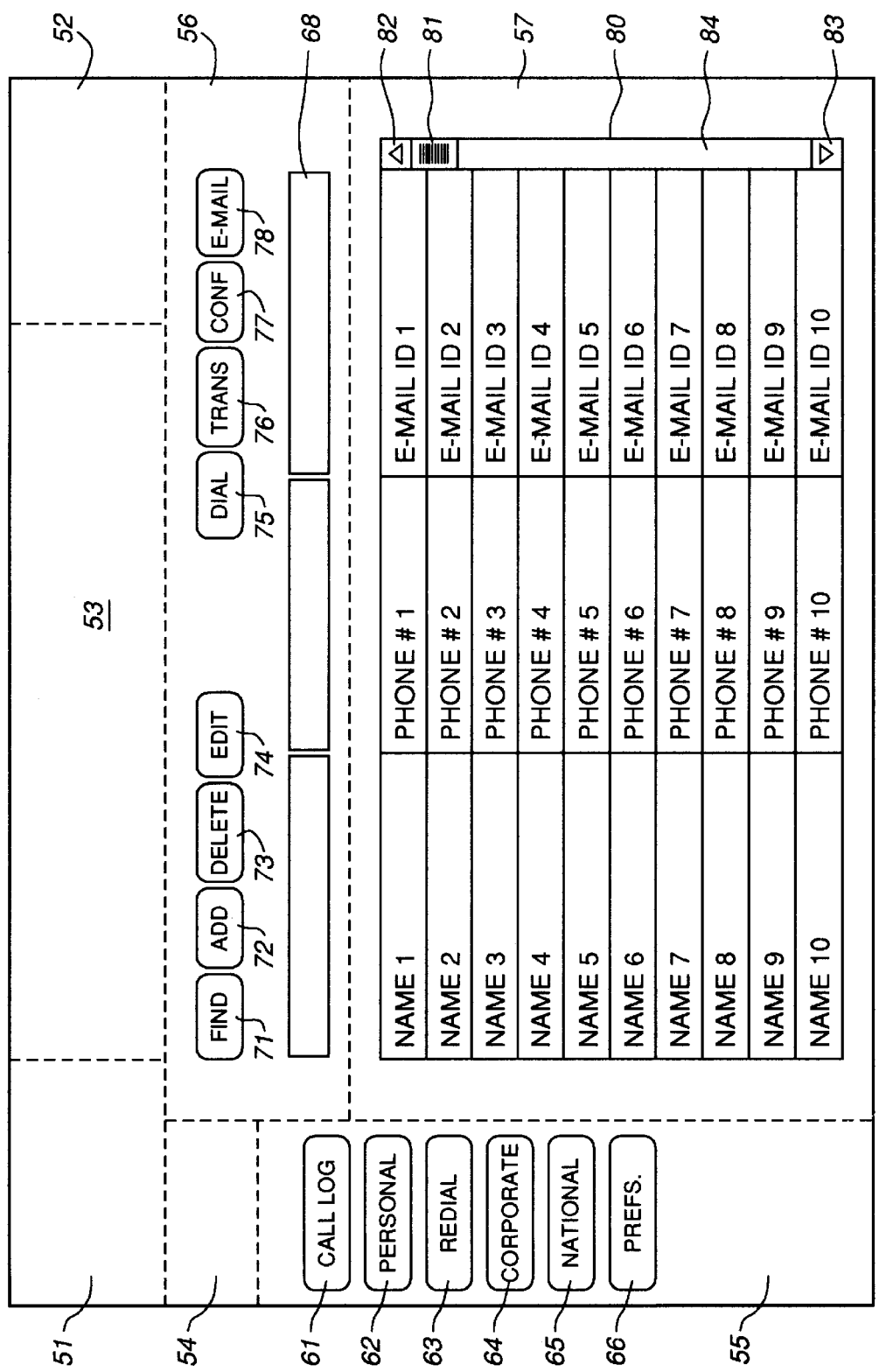
FIG. 3 illustrates an example of a web page layout which can be provided in the arrangement of FIGS. 1 and 2.

The web system 30 supports a web server 34, a web page manager 36, CGI (Communications Gateway Interface) scripts 38, and a cache (working data storage) 40. The web system 30 may also support an advertisement server (not shown). The web server 34 and advertisement server are commercially available software applications which need not be described further here. The web page manager 36 is a software application that manages the presentation of the call management web pages to the subscriber via the web 20, and that can easily be provided in known manner to provide any desired web page appearance. Purely by way of example and illustration, FIG. 3 shows one possible appearance of a call management web page, and this is further described below. The CGI scripts 38 are software procedures that receive high-level calls from the web server 34 and translate these into lower level operations to be executed in conjunction with the cache 40 and the call control system 32, with parameters being passed to and from the CGI scripts accordingly.

The call control system 32 supports a database 42, call APIs (Application Program Interfaces) 44, and a call control interface 46. The call control interface 46 is a commercially available product, such as Genesys T-Server™, that provides a network or direct interface via the path 24 to the SCI 26 of the telephone switch 16. The call APIs 44 communicate with the CGI scripts 38 of the web system 30 via paths 48, and translate CGI script operations into low level operations comprising calls to and from the call control interface 46 and the database 42. Thus the CGI scripts 38 and call APIs 44 simply provide successively lower level procedures or software routines for handling calls between the web page manager 36 running on the web server 34, the call control interface 46, and the database 42 and cache 40. The database 42 comprises, for example, a commercially available database manager using SQL (structured query language) in a known manner.

The paths 48 are shown in FIG. 2 for convenience as direct paths between the CGI scripts 38 and the call APIs 44, but they are preferably constituted by InternetProtocol paths communicating remote procedure calls between these units.

Referring to FIG. 3, one possible appearance of a call management web page provided by the web facility 22 is illustrated. It is emphasized that this, and the following description of call management functions which can be provided, are given purely by way of example and explanation, and the invention is not in any way limited to these examples or the manner in which they are provided.

As shown by dashed lines in FIG. 3, the web page is divided into frames which are referenced 51 to 57. The frames 51 and 52 can be used to display logos relating to the call management service and its provider, and the frame 53 can be used to display an advertising banner. The advertising banner can be provided by an advertisement server on the web system 30 as indicated above or externally of the web facility 22 elsewhere on the web 20. The manner in which advertising banners are called, provided, and displayed is well known in the art and need not be described here.

The frame 54 can be used to display data relating to the subscriber, for example his name, telephone number, and e-mail ID (electronic mail identity), when he is logged on, and otherwise to display a message indicating that the subscriber is not logged on. The frame 55 provides a number of function buttons 61 to 66, each constituting a hypertext tag in known manner, functions of which can be as described below.

The frame 56 provides editing windows 68 and buttons 71 to 78, each constituting a hypertext tag, of which the buttons 71 to 74 provide directory functions and the buttons 75 to 78 provide communication functions as described below. The frame 57 provides contents dependent upon the functions selected by the buttons 61 to 66, as further described below.

On initially accessing the web facility 22, the web page manager 36 produces the web page for example with logos in the frames 51 and 52, an advertising banner obtained from the advertisement server in the frame 53, and with the frame 57 presenting options (e.g. function buttons and/or editing windows) to permit the subscriber to register or log in. On logging in, the web page manager 36 communicates via the functions 38 and 44 to retrieve data for the subscriber from the database 44 and store this data in the cache 40 for convenient and rapid access. This data can include subscriber information which the page manager 36 then displays in the frame 54 as indicated above, preferences previously stored for the subscriber, and personal directories and call data as discussed further below. The page manager 36 then can also present the frames 55 and 56 for example as shown in FIG. 3, with the frame 57 being blank or containing any desired information.

On clicking the button 62 labelled PERSONAL, via the function 38 the web page manager 36 accesses a personal directory of the subscriber and displays this in a conventional scrolling window 80 within the frame 57. For example as shown in FIG. 3 each entry in the personal directory can have name, telephone number, and e-mail ID fields which are displayed in the window 80. A slider 81, arrows 82 and 83, and scroll bar 84 permit the subscriber to scroll through the personal directory records. Clicking on any record causes the fields of that record to be reproduced in the editing windows 68, where the record can be edited and updated by clicking on the button 74 labelled EDIT. A record identified in the windows 68 can be deleted from the personal directory by clicking on the button labelled DELETE. A desired record can be located by the subscriber entering search criteria in the windows 68 and clicking on the button 71 labelled FIND, and new records can be created in the personal directory from the windows 68 by the subscriber clicking on the button 72 labelled ADD. In this manner, via the web page manager 36 and the CGI scripts 38, the subscriber can set up and maintain the personal directory in the cache 40. Updating of the database 42 from the cache 40 can be carried out as desired in the background in a known manner.

The above functions of the buttons 71 to 74 do not involve communications via the call control interface 46. In contrast, the buttons 75 to 77 invoke communications functions which typically involve communications with the telephone switch 16 via the call control interface 46. For example, clicking on the button 75 labelled DIAL triggers the telephone switch 16 to set up a telephone connection between the subscriber's telephone 10 and a telephone directory number in the windows 68. This number can be entered and optionally edited by the subscriber by typing at the network browser 12, selected from the personal directory by clicking on a record in the window 80 as described above, or provided in another manner for example as described further below.

On clicking the DIAL button 75, the web page manager 36 communicates a message, containing a dial request, a calling telephone number CN of the subscriber (as displayed in the frame 54), and a called telephone number DN from the windows 68, via the functions 38 and 44 to the call control interface 46, via which this message is forwarded via the path 44 and SCI 46 to the telephone switch 16. The switch 16 checks validity of the telephone numbers and that the subscriber's telephone 10 (calling telephone number CN) is on-hook, and provides a (possibly distinctive) ringing signal to the telephone 10. The subscriber, expecting this ring signal, takes his telephone 10 off-hook, and this is detected by the telephone switch 16 in conventional manner, in response to which the switch 16 sets up the desired telephone connection to the called number DN in the same manner as if the number DN had been dialled by the subscriber at the telephone 10. Error and/or status messages can be communicated from the telephone switch 16 via the SCI 46, path 44, and functions 46, 44, and 38 to the web page manager 36, and displayed on the web page, as desired and appropriate.

It can be appreciated that, in the manner described above, the subscriber is able to instigate a telephone call to a desired number through his access to the web page, and not by dialling at the telephone 10.

In a corresponding manner, the subscriber can transfer an existing telephone call at his telephone 10 to another called number DN in the windows 68 by clicking the button 76 labelled TRANS. The web page manager again communicates the numbers CN and DN, with a call transfer request, to the telephone switch 16 via the functions 38, 44, 46, and 26, in response to which the switch 16 transfers the call from the telephone 10 (CN) to the called number (DN) and provides error and/or status messages to the web page manager 36 accordingly. Likewise, the subscriber can establish a conference connection to add another called number DN from the windows 68 to an existing telephone call at his telephone 10 by clicking the button 77 labelled CONF. The web page manager again communicates the numbers CN and DN, with a conference request, to the telephone switch 16 via the functions 38, 44, 46, and 26, in response to which the switch 16 establishes a conference connection of the call involving the telephone 10 (CN) with the additional called number (DN, again providing en-or and/or status messages to the web page manager 36 accordingly.

In response to clicking on the button 78 labelled E-MAIL, the web page manager 36 creates in known manner a window for the subscriber to enter an e-mail message to an e-mail ID from the window 68 or entered by the subscriber in the e-mail window, this being transmitted in known manner via the web 20. In this manner, electronic mail communications can also be established by the subscriber using the same web interface as for telephone voice communications. Other communications facilities, for example voice mail messages, and other telephony functions, can be similarly provided in analogous manner to the specific examples given above.

For telephone calls incoming to the telephone 10 via the telephone switch 16, the SCI 26 provides to the web facility 22 information messages containing for example the called and calling numbers, and the date and time of the call. This information is entered by the call APIs 44 into a call log for the respective subscriber in the database 42 via the functions 46 and 44. This takes place whether or not the subscriber's web browser 12 is active, so that the call log is not dependent on any activity of the subscriber. On log-in to the web page, the call log is supplied to the cache 40 as described above and is available to the subscriber. The subscriber can click the button 61 labelled CALL LOG, in response to which the web page manager 36 displays the call log in a scrolling window in the frame 57 in place of the personal directory. Each record in the call log can for example include a field containing the calling telephone number (e.g. as in the personal directory described above) supplied from the telephone switch 16 via the SCI 26, a field for a name which can be optionally provided either similarly by the telephone switch 16 by look-up from the calling telephone number, using the subscriber's (i.e. the called number's) personal directory via the database 42 or using other directory facilities such as a corporate directory as discussed below, and a field for the date and time of the call. Other fields, for example for the duration and status (e.g. answered or not) of the call provided by the SCI 26, and an associated e-mail address as described above and also provided by the database or directory lookup, can also be provided in the call log as desired.

In a similar manner to that described above for the personal directory, the subscriber can scroll through the call log, click on any record to reproduce it in the windows 68, click on the ADD button 72 to add a corresponding record to the subscriber's personal directory, click on the DIAL button 75 to establish a return call to the calling number, etc.

For alerting the subscriber to an incoming telephone call, a ringing signal is supplied to the telephone 10 in conventional manner. In addition, if the subscriber's web browser (or a sub-set of this such as a Java applet) is active, then the web page manager 36 is supplied with information about the call (e.g. calling number, name, etc. as provided for the call log as described above) via the functions 44 and 38 and provides an informative alert to the subscriber's web page (or applet window). This obviates the need for processing and display facilities in the telephone 10 to provide call information.

Correspondingly, the web facility maintains a called number log, of numbers called by the subscriber. Conveniently this can be similar to the call log described above, and for calls established by the subscriber using the web facility can use information supplied from the web page manager 36 and/or information supplied by the switch 16 via the SCI 26 as described above for incoming telephone calls to the subscriber. The latter information can also be used to maintain this called number log even for calls made in conventional manner from the telephone 10 without use of the web facility 22, so that the subscriber's web browser 12 does not need to be active for this called log to be maintained. In the same manner as described above for the call log, the subscriber can click on the button 63 labelled REDIAL to display the called number log in a window in the frame 57, and again the windows 68 and buttons 71 to 78 in the frame 56 can be used by the subscriber to maintain the called number log and, using the DIAL button 75, to redial previously called numbers.

A directory of employees of a corporation can be maintained by the web facility 22, for example as part of the database 42, and can be used as described above to determine names and other information corresponding to supplied telephone numbers. In addition, such a directory can be used generally by the subscriber using the web facility 22. In response to the subscriber clicking the button 64 labelled CORPORATE, the web page manager 36 in this case presents in the frame 57 a corporate directory search window in which the subscriber can enter search criteria to locate information for anyone in the directory. Such information is then displayed by the web page manager 36 in the frame 57, for example in a similar manner to the display of the subscriber's personal directory in this frame as described above and illustrated in FIG. 3. As in that situation and the other situations described above, the subscriber can scroll through the directory information, click on any record to reproduce it in the windows 68, click on the ADD button 72 to add a corresponding record to the subscriber's personal directory, click on the DIAL button 75 to establish a call to the selected number, etc.

Other directories can also be accessed by the subscriber via the web facility 22. For example, a national telephone directory, containing names, addresses, and telephone numbers, maintained elsewhere on the web 20 can be used by the subscriber by clicking on the button 65 labelled NATIONAL. In response to this the web page manager establishes an http (hypertext transfer protocol) link via the web 20 to the web site of the national directory in a known manner, and presents its search window to the subscriber in the frame 57. As in the case described above, the subscriber can then find information using the national directory, copy and paste it or click on it to reproduce it in the windows 68, and add the information to the subscriber's personal directory by clicking on the ADD button 72, dial the number by clicking on the DIAL button 75, etc. Other directories external to the web facility 22 can be similarly accessed.

The subscriber can also click on the button 66 labelled PREFS., in response to which the web page manager 36 presents in the frame 57 options for the subscriber to set preferences for his use of the web facility 22 in a known manner.

It will be apparent to those of ordinary skill in the art that all of the above functions, and many other functions which may be desired, can be provided in a relatively straightforward manner by simple messages or procedure calls and responses, with appropriate parameters and returned values, between functions of the web facility 22, and specifically between the web page manager 36 and the call control interface 46, cache 40, and database 42 via the CGI scripts 38 and the call APIs 44. Details of these procedures, parameters, and returned values depend on the particular functions that are provided and the particular manner in which the web facility 22 is implemented. Such details can be routinely determined by persons of ordinary skill and knowledge, and accordingly need not be, and are not, described here.

A number of significant advantages that may not be immediately apparent can be provided by embodiments of the invention. It can be appreciated that a subscriber can use any web browser 12 and any telephone 10 to provide all of the functions which are available via the web facility 22. Neither of these is required to have any special hardware or software features, beyond very basic capabilities of the telephone 10 and the inherent functioning of the web browser 12. The subscriber does not need to acquire or maintain any other software or hardware.

The subscriber is able to access his telephone web page on the web facility 22 from any web browser at any location. This enables all of his call management functions to be available to him regardless of where he may be, for example at home, in an office, or travelling using a mobile telephone and web browser. A particular advantage of this is provided if one of the telephone functions available to the subscriber is call forwarding. In this case for example the subscriber can access the web facility 22 from his office, activate via the web facility 22 a call fowarding function which causes the telephone switch 16 to redirect to his office telephone number calls that are directed to his home telephone number, and receive such calls at his office. Conversely, on returning home he can again access the web facility 22 to remove the call forwarding. The web facility 22 controls the telephone switch to effect and remove the call forwarding function in a similar manner to that described above for call transfer, using another button and related procedures to perform these functions.

Numerous other communications functions can be similarly and easily provided in a corresponding manner, and as already stated, the above description is given purely by way of illustration of the functions that may be provided. As can be appreciated, further functions (both known and yet to be developed) can be easily added by the web facility 22, and these can be made available immediately to the subscriber, possibly on a subscription or pay-per-use basis that enhances revenues to the service provider. Obviously, the same web facility can be used to serve an arbitrary number of subscribers.

Thus although a particular form of the invention has been described above, it can be appreciated that numerous modifications, variations, and adaptations may be made without departing from the scope of the invention as defined in the claims.

What is claimed is:

1. A method of making a telephone connection comprising the steps of:

storing, for access by a computer network facility which is remotely accessible using a web browser, telephone number information relating to a telephone subscriber;

remotely accessing the computer network facility using a web browser for display of said telephone number information to the subscriber;

producing at the computer network facility using the web browser a telephone connection message including information identifying a calling telephone number of the subscriber and a called telephone number;

communicating the telephone connection message from the computer network facility to a telephone switch via a switch-computer interface; and establishing a telephone connection between the calling and called telephone numbers from the switch in response to the telephone connection message.

2. A method as claimed in claim 1 wherein the step of establishing a telephone connection comprises the step of providing a ringing signal to a telephone identified by the calling telephone number.

3. A method as claimed in claim 1 wherein the telephone number information comprises a personal telephone directory of the subscriber.

4. A method as claimed in claim 1 wherein the telephone number information comprises logged information relating to telephone communications to and/or from the calling telephone number.

5. A method as claimed in claim 1 and further comprising the step of:

communicating information relating to telephone communications to and/or from the calling telephone number from the switch to the computer network facility;

wherein said telephone number information includes said information communicated from the switch.

6. A method as claimed in claim 5 wherein the telephone number information includes personal telephone directory information of the subscriber.

7. A method as claimed in claim 6 wherein the step of establishing a telephone connection comprises the step of providing a ringing signal to a telephone identified by the calling telephone number.

8. A telephone call management system comprising:

a computer network facility including a web server for communications with web browsers of telephone subscribers, an information database for storing telephone number information relating to the subscribers, and a telephone call control system;

a telephone switch including a switch-computer interface; and a communications path between the telephone call control system of the computer network facility and the switch-computer interface of the telephone switch;

wherein information relating to telephone communications to and/or from telephone numbers of subscribers is communicated via the communications path from the telephone switch to the computer network facility and is stored in the database for the respective subscribers, and information for controlling telephone communications is communicated via the communications path from the computer network facility to the telephone switch in response to remote access by the respective subscribers to the information database via web browsers of the respective subscribers and the web server of the computer network facility.

9. A system as claimed in claim 8 wherein information stored in the database comprises telephone numbers calling and/or called by the telephone subscribers.

10. A system as claimed in claim 9 wherein information stored in the database further comprises personal telephone directories of the telephone subscribers.

11. A system as claimed in claim 8 the information for controlling telephone communications communicated from the computer network facility to the telephone switch comprises information identifying a telephone number of a subscriber remotely accessing the server of the computer network facility and information identifying a telephone connection request and another telephone number associated with the request.

12. A method of telephone call management, comprising the steps of:

storing personal telephone directories and call logs of telephone subscribers for remote access by the subscribers via a web facility;

supplying information, relating to at least some telephone communications associated with the telephone subscribers, from a telephone switch to the web facility;

updating the personal telephone directories and call logs of the telephone subscribers in dependence upon information supplied by the subscribers by the remote access via the web facility and the information supplied from the telephone switch; and supplying information from the web facility to the telephone switch, for controlling telephone communications for the subscribers via the telephone switch, in response to the remote access by the subscribers via the web facility.

13. A method as claimed in claim 12 wherein the information supplied from the telephone switch to the web facility identifies calling and called telephone numbers of the telephone subscribers.

14. A method as claimed in claim 12 wherein the information supplied from the web facility to the telephone switch identifies subscriber telephone numbers and connection requests identified by the subscribers by the remote access via the web facility.

* * * * *